(12) United States Patent
Ramage

(10) Patent No.: X8500
(45) Date of Patent: Nov. 19, 1834

(54) PRINTING PRESS

(76) Inventor: Adam Ramage

Adam Ramage of Philadelphia, Pennsylvania

Letters Patent

The schedule referred to in these Letters Patent and making part of the same, containing a description of the words of the said Adam Ramage, himself, of his improvement in the Printing Press.

Be it known that I Adam Ramage of the City and County of Philadelphia and State of Pennsylvania, have made an improvement in the Printing Press; which is described as follows.

The press consists of the frame, for containing and supporting the different parts of the press. the carriage on which the types or other object to be impressed are placed; the ribs upon which the carriage in and out below the platen, The Platen for giving the impression, a vertical bar attached to the platen, and for pressing it down upon the types:— the spiral spring for raising the platen up again, and a lever with a cam or toggle joint attached to one end and turning on gudgeons, or a pin for working the press, placed on the top head of the press, The frame which is made of wrought-iron is of any convenient size and strength adapted to the size of the Press – and is something of this shape 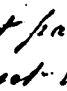 that is the lower part of the cheeks, are straight– and parallel; the sides of the upper parts incline inward; and the top joins the sides together, either in a straight line or a curve, A bar or plate of wrought iron, of suitable size and thickness extends from one cheek to the other, at or near the point where the cheeks make an angle or bend; through this bar or plate, passes the vertical bar, attached to the platen, also the iron pins fixed to the upper side of the platen by which its sides are kept parallel whilst working, Tho' the top or head of the frame is an opening which admits the passage of the vertical bar upon the upper end of which the power is applied, —
The vertical bar attached to the platten is also made of wrought iron & steel, is of size and strength adapted to the press; passing thro the horizontal plate, connecting the cheeks, and the head or top of the frame, — Around this upright bar is a spiral screw, for raising the platten, one end of which rests upon the horizontal plate and the other is attached to a female screw, which turns on a screw cut on the vertical bar, and by which the spiral spring can be regulated, — To the end of the lever which works on gud geons or Journals, is attached a segment of an elliptical or excentric roller, on a toggle joint working on the top of the vertical bar, and gives the pressure upon the platten and types &c.
Upon the top of this vertical bar, a small piece of steel is placed between the pressing power and top of the vertical bar, working in a channel. A regulating screw is so placed as to regulate the force to be given by the lever &c.
All the other parts of the press are too well known to need a farther description. Operation The form or thing to be pressed, having been placed upon the carriage, is inked, and the white paper put upon the tympan and the frisket turned down The carriage is then run in by the runner under the platten The pressman or operator then lays hold of the bar, and forces the excentric roller or toggle joint down upon the head of the vertical bar; which forces the platten down upon the types &c and gives the impression required
The invention here claimed and desired to be secured by Letters Patent, consists in the general construction of the before described press, with the arrangement of its several parts, so as to do away with many of the expensive parts of the common printing Press; and to produce one, which at the same time combines cheapness, power, and conveniences. But what I particularly claim as my improvement is the wrought iron frame, which has the strength of a wrought iron bar, drawn lengthwise This principle I claim, however applied in the printing Press and of whatever shape the head and cheeks may be made, or for seal or copying presses.—

For a further illustration of my invention and improvement I refer to the model and drawing of the same deposited in the Patent Office In testimony whereof I have subscribed my name before two witnesses, this eighth day of November 1834.

Witnesses
William Milnor
Ethan Sayres

Adam Ramage

[illegible]

Exd
M.G.C